US010009051B1

(12) United States Patent
Yan et al.

(10) Patent No.: US 10,009,051 B1
(45) Date of Patent: Jun. 26, 2018

(54) MODEM-AGNOSTIC ANALOG SPATIAL MULTIPLEXING

(71) Applicant: Facebook, Inc., Menlo Park, CA (US)

(72) Inventors: Yan Yan, Culver City, CA (US); Abhishek Tiwari, Oak Park, CA (US); Pratheep Bondalapati, Woodland Hills, CA (US); Chiyun Xia, Agoura Hills, CA (US); Tobias Gerard Tiecke, Redwood City, CA (US); Qi Tang, Woodland Hills, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

(21) Appl. No.: 15/803,761

(22) Filed: Nov. 4, 2017

(51) Int. Cl.
| | |
|---|---|
| *H04K 1/10* | (2006.01) |
| *H04L 27/28* | (2006.01) |
| *H04B 1/04* | (2006.01) |
| *H04B 7/06* | (2006.01) |
| *H04B 7/0413* | (2017.01) |
| *H04L 12/875* | (2013.01) |

(52) U.S. Cl.
CPC ......... *H04B 1/0483* (2013.01); *H04B 7/0413* (2013.01); *H04B 7/0697* (2013.01); *H04B 2001/0491* (2013.01); *H04L 47/56* (2013.01)

(58) Field of Classification Search
CPC ............... H04B 1/0483; H04B 7/0697; H04B 2001/0491; H04B 7/0413; H04B 1/0007; H04B 7/18534; H04B 7/086; H04B 7/0408; H04L 47/56
USPC ................ 375/260, 346, 347, 349, 350, 232
See application file for complete search history.

(56) References Cited

U.S. PATENT DOCUMENTS

| | | | | |
|---|---|---|---|---|
| 5,940,029 A | * | 8/1999 | Ninomiya ........... | G01S 13/4409 342/154 |
| 6,256,340 B1 | * | 7/2001 | Schilling .................. | G01S 3/42 342/375 |
| 7,339,979 B1 | * | 3/2008 | Kelkar ................. | H04B 7/0408 375/147 |
| 2004/0087294 A1 | * | 5/2004 | Wang .................... | H04B 7/086 455/276.1 |
| 2009/0011704 A1 | * | 1/2009 | Karabinis .......... | H04B 7/18534 455/13.4 |
| 2014/0064341 A1 | * | 3/2014 | Johansson ............ | H04B 1/0007 375/219 |

(Continued)

*Primary Examiner* — Phuong Phu
(74) *Attorney, Agent, or Firm* — Brian R. Short (57) ABSTRACT

Apparatuses, methods, and systems for analog spatial multiplexing are disclosed. One apparatus includes a receiver, wherein the receiver includes a plurality of antennas operative to receive a plurality of wireless signals, a plurality of tunable time delays, and a plurality of frequency response equalizers, wherein a time delay of each of the tunable time delays is adjusted based on a feedback of measurements of one or more pilot tones of more than one output of the plurality of frequency response equalizers. The receiver further includes a plurality of frequency up-converters generating a plurality of frequency up-converted signals, a MIMO processor receiving the plurality of frequency up-converted signals, wherein the MIMO processor adjusts a gain and phase of the of the frequency up-converted signals based on the measurements of the pilot tones, and a plurality of frequency down-converters receiving and frequency down-converting output signals from the MIMO processor.

20 Claims, 10 Drawing Sheets

(56) References Cited

U.S. PATENT DOCUMENTS

2016/0323895 A1 11/2016 Pourahmadi et al.
2017/0134073 A1 5/2017 Babaei et al.

* cited by examiner

Receiving, by a plurality of antennas, wireless signals, wherein the wireless signals originate from a multiple antenna transmitter, wherein a signal transmitted from each antenna of the multiple antenna transmitter includes one or more pilot tones configurations that are unique to the transmitted signal

610

Adjustably time delaying the received wireless signals, by a plurality of tunable time delays, wherein each tunable time delay receives a corresponding one of the plurality of wireless signals after the wireless signals have been frequency down-converted

620

Adjusting a frequency response, by a plurality of frequency response equalizers, wherein each frequency response equalizer receives a corresponding tunable delay output and adjusts the frequency response, wherein a time delay of each of the tunable time delays is adjusted based on a feedback of measurements of the one or more pilot tones of more than one output of the plurality of frequency response equalizers

630

Generating a plurality of frequency up-converted signals, by a plurality of frequency up-converters, wherein each frequency up-converter frequency up-converts a corresponding one of output signals of the plurality of frequency response equalizers

640

A MIMO (multiple-input, multiple-output) processor receiving the plurality of frequency up-converted signals, wherein the MIMO processor adjusts a gain and phase of the of the frequency up-converted signals based on the measurements of the one or more pilot tones

650

Receiving and frequency down-converting output signals from the MIMO processor, by a plurality of frequency down-converters, wherein each of a plurality of frequency down-converted signal are received by a SISO (single input, single output) modem

FIGURE 10

MODEM-AGNOSTIC ANALOG SPATIAL MULTIPLEXING

FIELD OF THE DESCRIBED EMBODIMENTS

The described embodiments relate generally to wireless communications. More particularly, the described embodiments relate to systems, methods and apparatuses for analog spatial multiplexing.

BACKGROUND

Wireless links have an ever increasing demand on the data rate of data communicated through the wireless links. With more and more people using broadband internet this demand is only projected to grow further. Some of the application use cases include high capacity terrestrial wireless links to bridge fiber connections across obstacles, and high capacity satellite uplinks.

MIMO (multiple-input, multiple-output) wireless links using spatial multiplexing can be used to scale capacity further once higher order modulation becomes impractical and time/frequency/polarization multiplexing degrees of freedoms have been exhausted. However, a solution is needed that supports spatial multiplexing over several GHz of RF (radio frequency) bandwidth, especially in mm (millimeter)-wave bands.

Traditional spatial multiplexing architectures digitize signal streams from multiple antennas and perform spatial multiplexing processing in digital baseband. This has limitations when the signal bandwidth is several GHz. That is, high speed digital interconnects and digitizers are needed that are power hungry. Further, since processing needs to be done at high symbol rates digital implementations are heavily pipelined resulting in high latency.

Further, attempts at analog spatial multiplexing architectures also have limitations. That is, these architectures suffer from a bandwidth that is not wide enough, and inter-stream interference cancellation can only be guaranteed for a few 100's of MHz. Further, these previous attempts at analog spatial multiplexing architectures cannot handle large delay spreads (several multiples of carrier wavelengths) experienced in air to ground or satellite to ground links. Further, the performance degrades if multiple analog front ends have widely different frequency responses. Further, performance cannot be guaranteed under atmospheric scintillation experienced over long range mm-wave links.

It is desirable to have methods apparatuses, and systems for broadband analog spatial multiplexing over broad bandwidth (several GHz).

SUMMARY

An embodiment includes a receiver. The receiver includes a plurality of antennas operative to receive a plurality of wireless signals, wherein the wireless signals originate from a multiple antenna transmitter, wherein a signal transmitted from each antenna of the multiple antenna transmitter includes one or more pilot tones configurations that are unique to the transmitted signal, a plurality of tunable time delays, wherein each tunable time delay receives a corresponding one of the plurality of wireless signals after the wireless signals have been frequency down-converted, and a plurality of frequency response equalizers, each frequency response equalizer receiving a corresponding tunable delay output and adjusting a frequency response, wherein a time delay of each of the tunable time delays is adjusted based on a feedback of measurements of the one or more pilot tones of more than one output of the plurality of frequency response equalizers. The receiver further includes a plurality of frequency up-converters generating a plurality of frequency up-converted signals, wherein each frequency up-converter frequency up-converts a corresponding one of output signals of the plurality of frequency response equalizers, a MIMO processor receiving the plurality of frequency up-converted signals, wherein the MIMO processor adjusts a gain and phase of the of the frequency up-converted signals based on the measurements of the one or more pilot tones, and a plurality of frequency down-converters receiving and frequency down-converting output signals from the MIMO processor, wherein each of a plurality of frequency down-converted signal are received by a SISO (single input, single output) modem.

Another embodiment includes method. The method includes receiving, by a plurality of antennas, wireless signals, wherein the wireless signals originate from a multiple antenna transmitter, wherein a signal transmitted from each antenna of the multiple antenna transmitter includes one or more pilot tones configurations that are unique to the transmitted signal, adjustably time delaying the received wireless signals, by a plurality of tunable time delays, wherein each tunable time delay receives a corresponding one of the plurality of wireless signals after the wireless signals have been frequency down-converted, and adjusting a frequency response, by a plurality of frequency response equalizers, wherein each frequency response equalizer receives a corresponding tunable delay output and adjusts the frequency response, wherein a time delay of each of the tunable time delays is adjusted based on a feedback of measurements of the one or more pilot tones of more than one output of the plurality of frequency response equalizers. The method further includes generating a plurality of frequency up-converted signals, by a plurality of frequency up-converters, wherein each frequency up-converter frequency up-converts a corresponding one of output signals of the plurality of frequency response equalizers; receiving, by a MIMO processor the plurality of frequency up-converted signals, wherein the MIMO processor adjusts a gain and phase of the of the frequency up-converted signals based on the measurements of the one or more pilot tones, and receiving and frequency down-converting output signals from the MIMO processor, by a plurality of frequency down-converters, wherein each of a plurality of frequency down-converted signal are received by a SISO (single input, single output) modem.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6 is a flow chart that includes steps of a method of analog spatial multiplexing, according to an embodiment.

DETAILED DESCRIPTION

The embodiments described include methods, apparatuses, and systems for modem-agnostic analog spatial multiplexing. For an embodiment, wireless signals are transmitted from a multiple antenna transmitter that include pilot tones, wherein the pilot tones for each of the transmitted signals are uniquely configured for each of the multiple transmit antennas, thereby allowing the transmitted signals to be identified based on the transmit antenna that transmitted the signal. Further, for an embodiment, a receiver receives the transmitted signals through multiple receiver antennas, measures the pilot tones, and continually and adaptively adjusts for propagation time delays of the transmission signals. Further, for an embodiment, the pilot tones are also used for training a transmission channel between the multiple antenna transmitter and the multiple antenna receiver. The training is used for adjusting a phase and amplitude of the received signals through MIMO (multiple-input, multiple-output) processing. Further, for an embodiment, the receive signals are frequency up-converted before the MIMO processing, thereby allowing for greater suppression of spatially separate signals within a given frequency bandwidth. For an embodiment, the output signals of the MIMO processing are each received by a SISO (single input, single output) modem.

As described, for at least some embodiments, the pilot symbols of each transmit signal are different, which to allow the receiver to distinguish between the received wireless signals. This allows each antenna of the receiver to determine which transmitter the received signal came from, thereby allowing the receiver to determine and compensate for the signal propagation delay difference between the transmitter and the different receive antennas of the receiver.

For at least some embodiments, the measured pilot tones are used for adjusting a delay of the received signals. For an embodiment, the adjustment to the delay of the received signals allows the receiver to align in time the receive signal of the different receiver antennas.

For an embodiment, the measurements of the pilot tones provides the dual purpose of being used for adjusting for the time delays of the received signals, and for characterizing the transmission channel which is used for selecting amplitude and phase adjustments of the MIMO processing, which provides processing for spatially separating the received signals.

For an embodiment, the received signals are frequency up-converted before the MIMO processing. This allows the MIMO processing to provide greater suppression for a given bandwidth.

Figure 1:
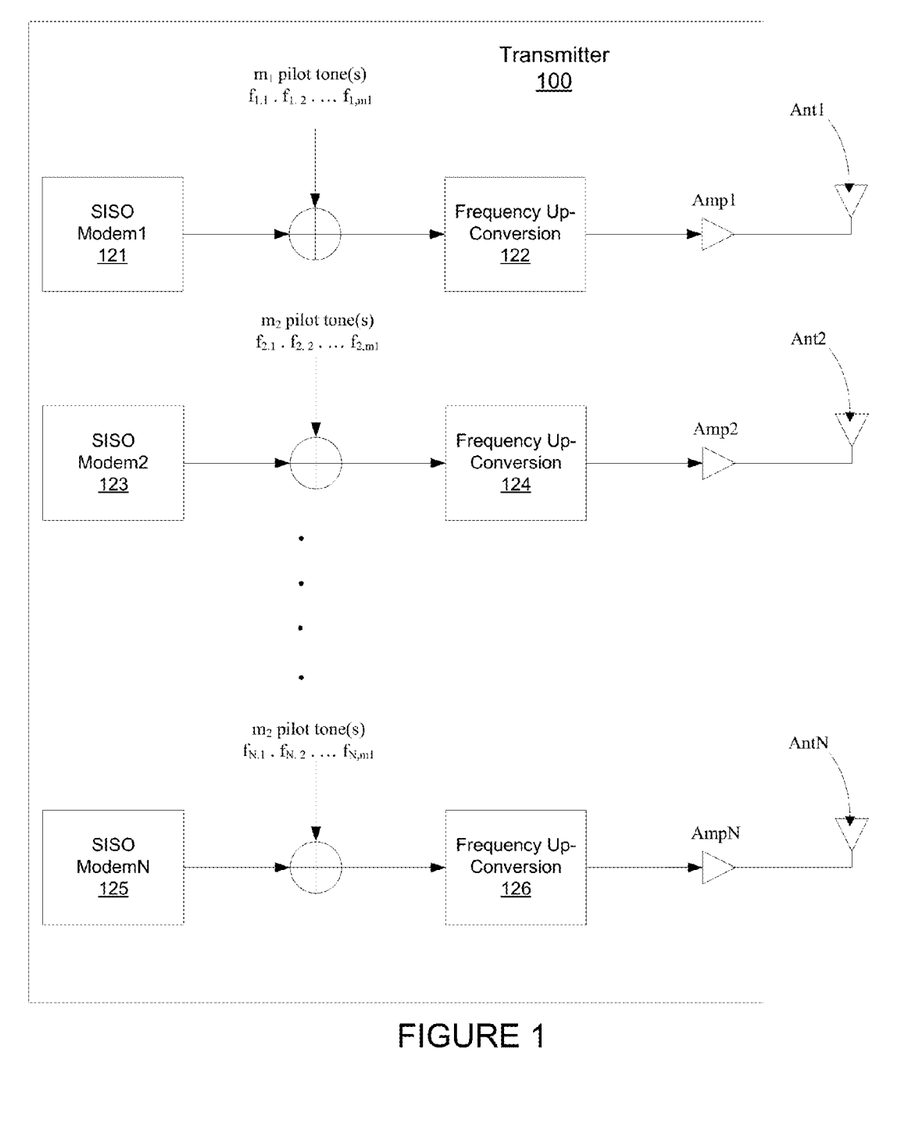
FIG. 1 shows a multiple antenna transmitter, according to an embodiment.

FIG. 1 shows a multiple antenna transmitter 100, according to an embodiment. As shown, a transmitter 100 includes N SISO (single-input, single-output) modems 121, 123, 125. A SISO modem is a modem designed for wireless communication with a single transmitter antenna and a single receiver antenna. For an embodiment, the multiple antenna transmitter 100 is a MIMO (multiple-input, multiple-output) transmitter that includes the plurality of SISO modems 121, 123, 125.

As shown in FIG. 1, pilot tones are included within signals generated by each of the SISO modems 121, 123, 125. That is, a signal generated by the first SISO modem 121 is modulated to include pilot tones $f_{1,1}, f_{1,2}, \ldots f_{1,m1}$, the signal generated by the second SISO modem 123 is modulated to includes the pilot tones $f_{2,1}, f_{2,2}, \ldots f_{2,m1}$, and the signal generated by the Nth modem 125 is modulated to include the pilot tones $f_{N,1}, f_{2,2}, \ldots f_{2,m1}$. As previously stated, the pilot tone configuration of each of the transmitted signals is unique, which allows the receiver of the transmitted signals to identify which transmitter antenna the received signal came from.

For an embodiment, the frequency of the pilot tones is different from one transmitter to the other transmitter. For an embodiment, the frequency of each pilot tone is outside of edges of the signal spectrum of the receiver modem bandwidth so that the pilot tone does not interfere with the transmitted signal. At least some embodiments include dual pilot tones wherein the pilot tones are distributed on both sides of the signal spectrum.

For an embodiment, the SISO transmission signals are frequency up-converted (122, 124, 126) before being transmitted through a corresponding transmitter antenna Ant1, Ant2, . . . AntN.

Figure 2:
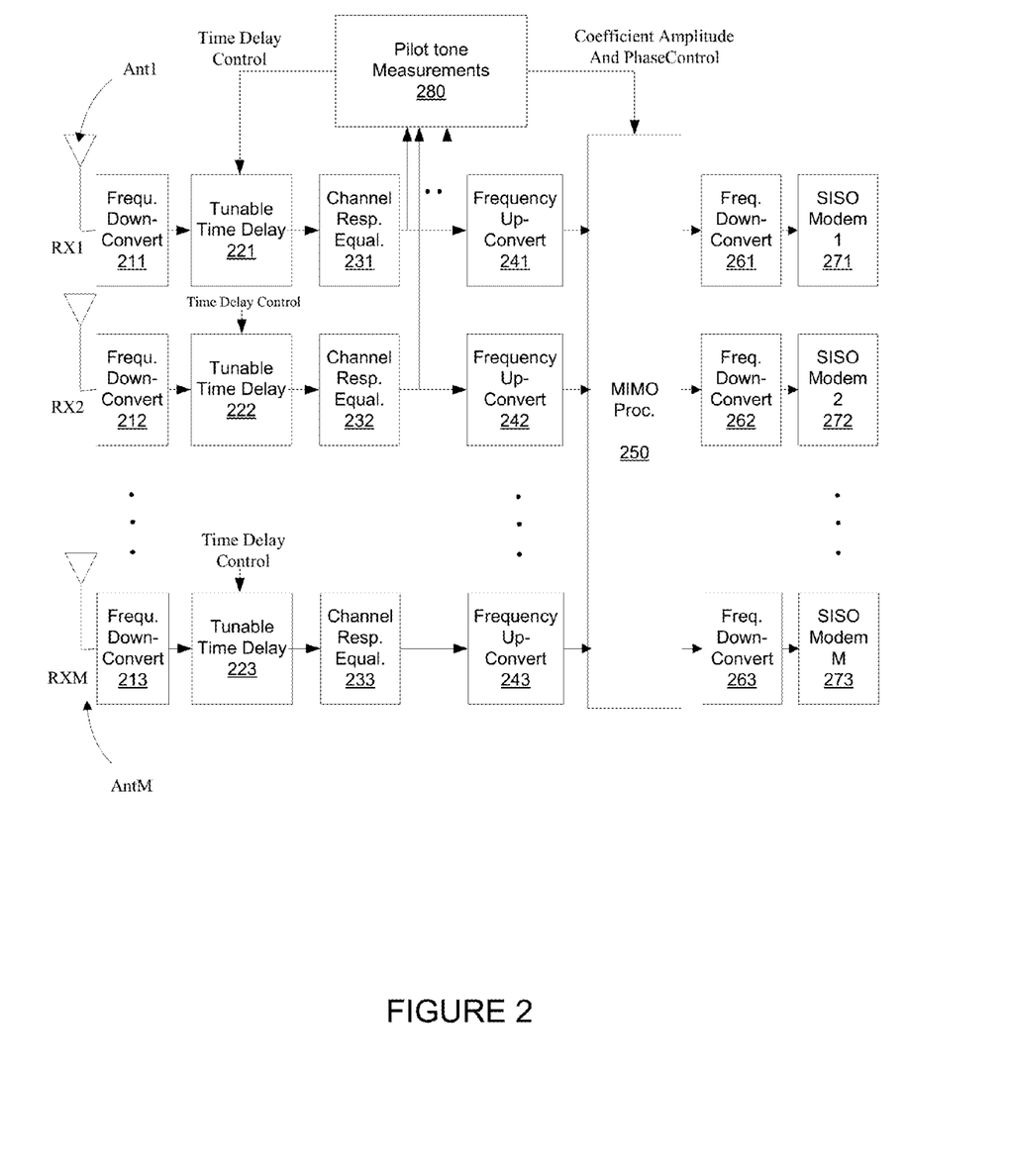
FIG. 2 shows a multiple antenna receiver, according to an embodiment.

FIG. 2 shows a multiple antenna receiver, according to an embodiment. As shown, the receiver includes M antennas for M receiver chains (RX1, RX2, . . . RXM). For an embodiment, the plurality of M antennas are operative to receive a plurality of wireless signals, wherein the wireless signals originate from the multiple antenna transmitter, For an embodiment, a signal transmitted from each antenna of the multiple antenna transmitter includes one or multiple pilot tones configured to uniquely identify the transmitted signal.

The received signals are frequency down converted 210, 212, 213, and each input to a corresponding one of a plurality of tunable time delays 221, 222, 223. Each of the tunable time delays are operative to continuously provide a tunable delay of the corresponding received signal. Each of the tunable time delays 221, 222, 223 includes a delay control that controls the delay of the tunable time delay 221, 222, 223. For an embodiment, the tunable time delays include optical circuitry.

For an embodiment the optical circuitry of the tunable time delays includes a continuously wavelength tunable optical source and dispersion in an optical fiber. For an embodiment, the amount of size of the tunable time delay is controlled based on the product of a wavelength change (nm) and a dispersion of the optical fiber (ps/nm). The continuous wavelength laser, of which the output optical power remains constant when the wavelength is being tuned, is one key to enable the continuous operation of the communication link when the delay is being tuned.

The outputs of the tunable time delays 221, 222, 223 are input to channel response equalizers 231, 232, 233. Each of the channel response equalizers 231, 232, 233 adjusts a frequency response of a channel of the corresponding received signal. For an embodiment, the frequency response of each channel is adjusted to reduce the differences in the frequency response between the channels.

The pilot tones of the receive signals are measured (280). For an embodiment, the measurements include determining the propagation delay between a transmitter antenna and at least two different receiver antennas. For an embodiment, a time delay of each of the tunable time delays 221, 222, 223 is adjusted based on a feedback of measurements of pilot tones of more than one output of the plurality of frequency response equalizers 231, 232, 233. As previously described, for an embodiment, the tunable time delays 221, 222, 223 are adjusted to align the signals received at the different receive antennas from a common transmitter antenna. That is, the received signal can be misaligned due to propagation delay during the flight time from the transmitter to the multiple receiver antennas. The tunable delays are adjusted to compensate for this misalignment due to the propagation delays.

As described, for an embodiment, a plurality of frequency up-converters 241, 242, 243 generate a plurality of frequency up-converted signals, wherein each frequency up-converter 241, 242, 243 frequency up-converts a corresponding one of output signals of the plurality of frequency response equalizers 231, 232, 233. As will be shown and described, frequency up-converting the received signals before the MIMO processing allows for the MIMO processing to more easily provide suppression of undesired signals. For an embodiment, the corresponding one of output signals of the plurality of frequency response equalizers 231, 232, 233 are frequency up-converted enough to allow for frequency response suppression of greater than a threshold within certain bandwidth. If more frequency response suppression is desired, the up-conversion frequency can be increased.

For an embodiment, a MIMO processor 250 receives the plurality of frequency up-converted signals. The MIMO processor 250 adjusts a gain and phase of the of the frequency up-converted signals based on the measurements of the one or more pilot tones. The measurements of the pilot tones provide channel training or a transmission channel estimate of the wireless channel between the multiple transmitter antennas and the multiple receiver antennas. The channel estimate is used to by the MIMO processing of the MIMO processor 250 to spatially separate each received signal.

For at least some embodiments, a plurality of frequency down-converters 261, 262, 263 receive and frequency down-convert output signals from the MIMO processor 250. For an embodiment, each of a plurality of frequency down-converted signal are received by a SISO (single input, single output) modem 271, 272, 273.

Figure 3:
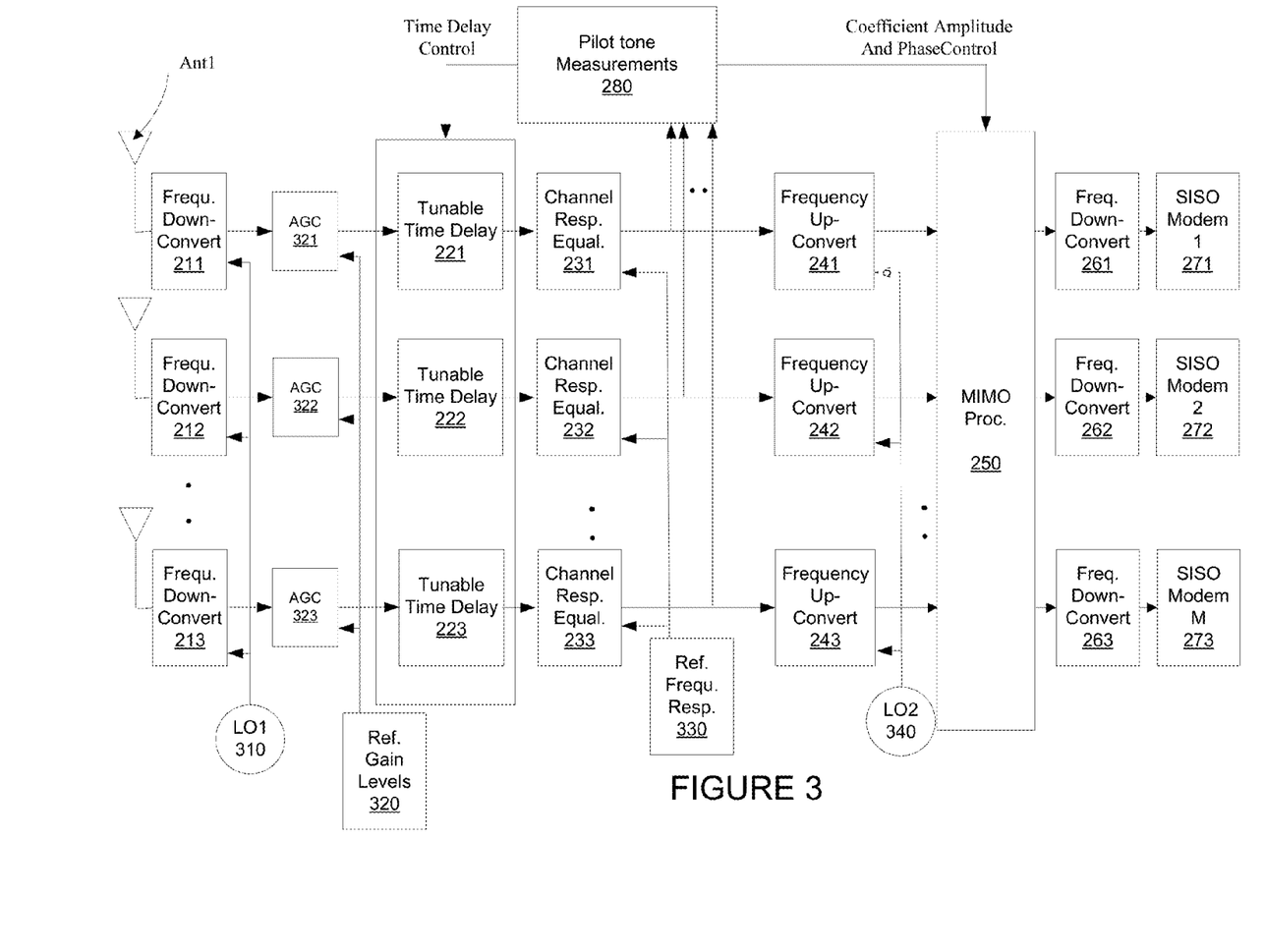
FIG. 3 shows an analog MIMO receiver, according to an embodiment.

FIG. 3 shows an analog MIMO receiver, according to another embodiment. This embodiment further includes a local oscillator (LO1) for frequency down-converting the received signals.

Further, FIG. 3 includes AGC (automatic gain control) 321, 322, 323 for adjusting gain levels of each of the received signals as provided by a reference gain controller 320.

Further, a reference frequency response controller 330 adjustably sets the frequency responses of the channel response equalizers 231, 232, 233.

This embodiment further includes a local oscillator (LO2) for frequency up-converting the received signals after the received signals have been delayed and passed through the channel response equalizers 231, 232, 233. As described, this frequency up-conversion enables the MIMO processing to more readily suppress undesired received signals over a bandwidth. The frequency of the LO2 can be the same as for the LO1, or the frequency of the LO2 can be different than the frequency of the LO1.

Figure 4:
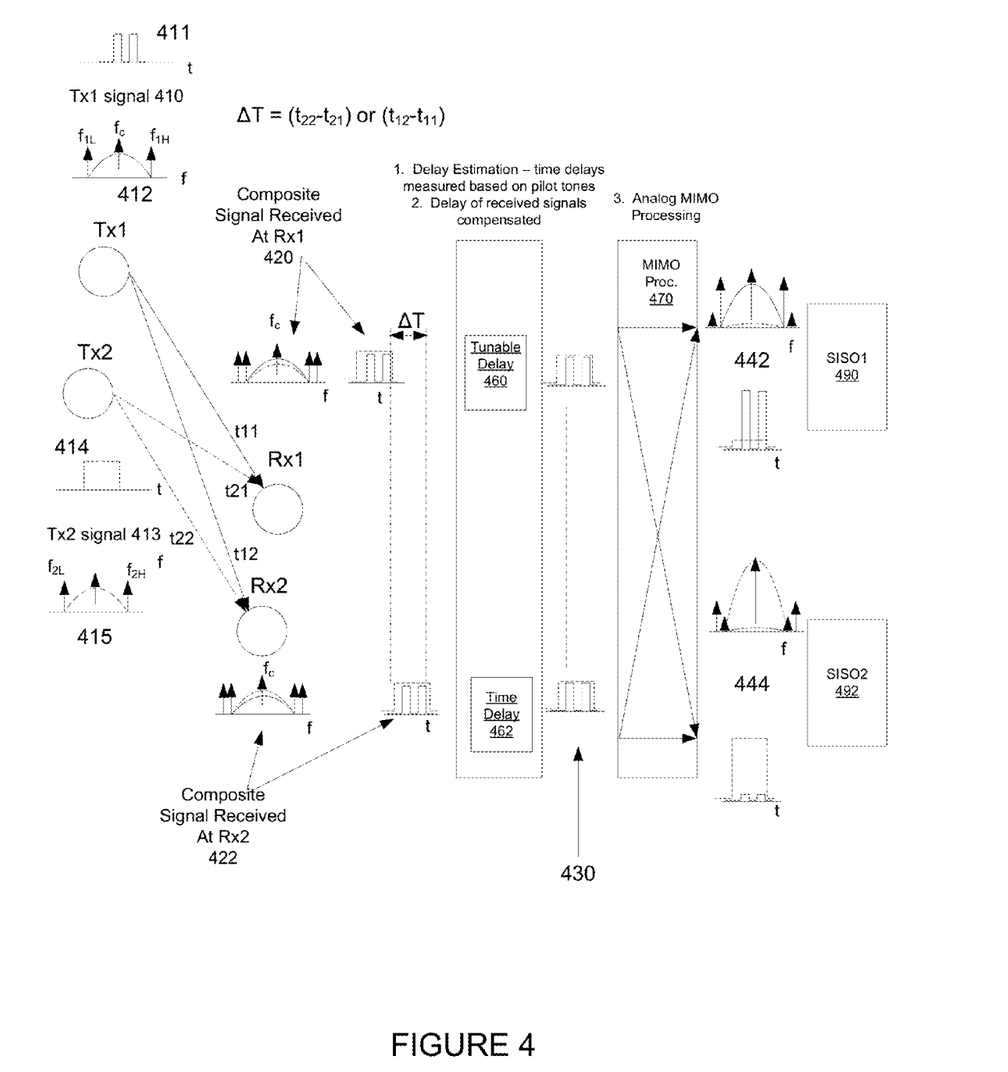
FIG. 4 shows transmitters and an analog MIMO receiver wherein the received signals include pilot tones, according to an embodiment.

FIG. 4 shows transmitters and an analog MIMO receiver wherein the received signals include pilot tones, according to an embodiment. As shown, a first transmitter TX1 transmits a Tx1 signal 410. The Tx1 signal 410 includes a signal as shown in the time domain 411, and pilot symbols as shown in the frequency domain 412. Further, as shown, a second transmitter TX2 transmits a Tx2 signal 413. The Tx2 signal 413 includes a signal as shown in the time domain 414, and pilot symbols as shown in the frequency domain 415.

A first antenna and receiver (Rx1) of the receiver receives a composite signal 420 that includes both the signal Tx1 410 transmitted from the first transmitter antenna TX1 and the signal Tx2 413 transmitted from the second transmitter antenna TX2. A second antenna and receiver (Rx2) of the receiver receives a composite signal 422 that includes both the signal Tx1 410 transmitted from the first transmitter antenna TX1 and the signal Tx2 413 transmitted from the second transmitter antenna TX2.

As shown, both the composite signal 420 and the composite signal 422 include components of both the signal Tx1 410 and the signal Tx2 413. In some situations, the propagation time between the transmitters TX1, TX2 and the receivers RX1, RX2 is great enough that a time delay between the reception of the signal Tx1 410, and the signal Tx2 413 is observable. As shown, a time delay $\Delta T$ is observable between the composite received signal 420 at Rx1 and the composite received signal 422 at Rx2. The time delay between the received signal can be given as $\Delta T = (t_{22} - t_{21})$ or $(t_{12} - t_{11})$, where $t_{11}$ is the propagation delay between TX1 and RX1, $t_{12}$ is the propagation delay between TX1 and RX2, $t_{22}$ is the propagation delay between TX2 and RX2, and $t_{21}$ is the propagation delay between TX2 and RX1.

As previously described, the time delay between the received signals is determined by measuring the pilot tones of the received signals. That is, the pilot tones of each of the transmitted signals are configured to allow the transmitted signals of each transmitter antenna to be identified. Once identified, the time delay can be determined.

For an embodiment, the determined time delay is used to adjust the tunable time delay of a corresponding received signal. As shown in FIG. 4, for example, the composite received signals 420, 422 are delayed so that at the output of the delays 460, 462, the composite received signals are aligned in time (430). That is, the tunable time delay 460 compensates for the difference in the propagation delay ($\Delta T$) of the transmission signal paths, and realigns the composite received signals.

After the compensation of the propagation delay, for an embodiment, the composite signals are frequency up-converted and provided to the MIMO processing 470. The MIMO processing further adjusts at least one of the phase and amplitude of the received signals based on channel measurements determined from the measured pilot tones. The MIMO processing spatially separates the received signals which include enhancing the received signals from one transmit antenna and suppressing received signals from another transmit antenna. As shown, one output 442 of the MIMO processing 470 includes enhancement of the signal received from the first transmitter TX1 and suppressing of the signal received from the second transmitter TX2. Further, another output 444 of the MIMO processing 470 includes enhancement of the signal received from the second transmitter TX2 and suppressing of the signal received from the first transmitter TX1.

Further, for an embodiment, the output signals 442, 444 are provided to SISO modems 490, 492.

Figure 5:
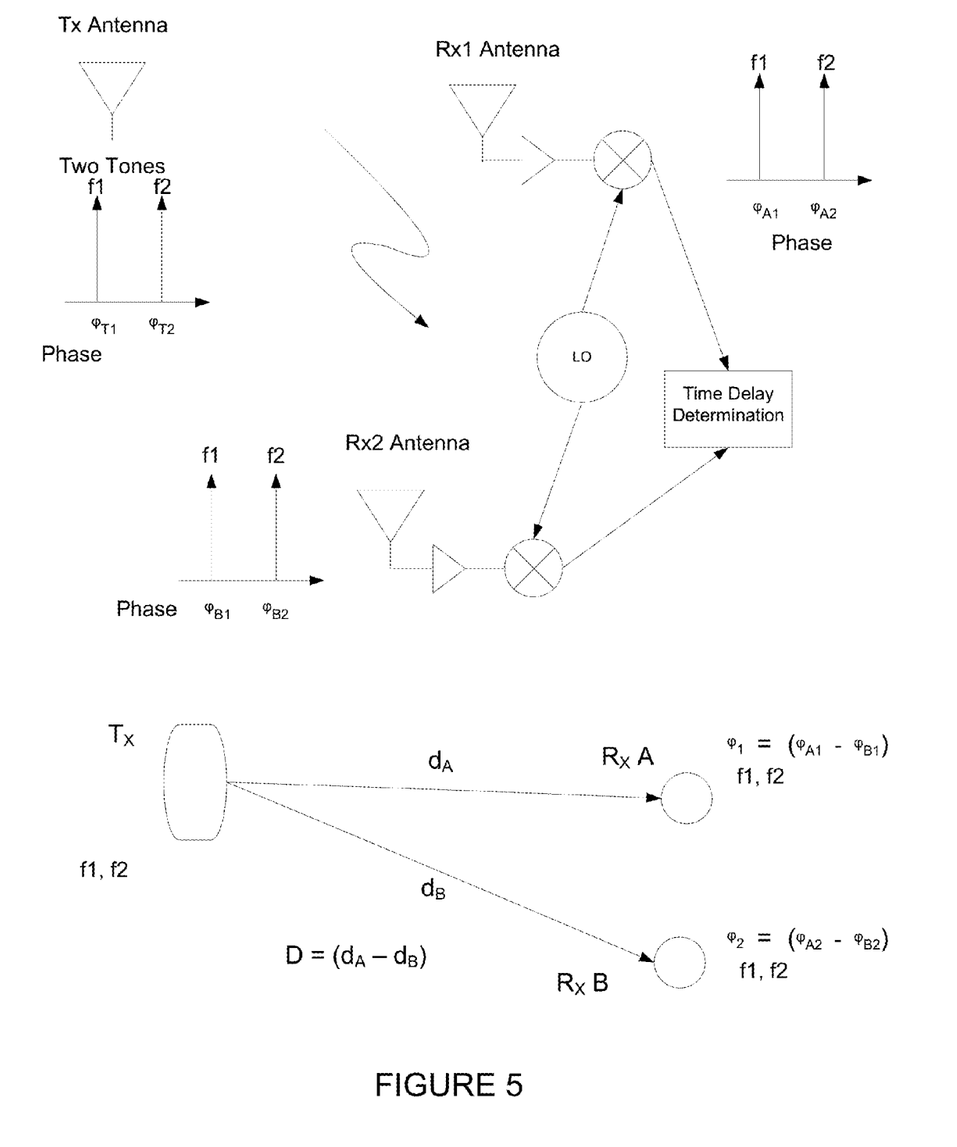
FIG. 5 shows a measurement of signal delay based on phase information of two pilot tones that are from the same transmitter and received by two different receivers, according to an embodiment.

FIG. 5 shows a measurement of signal delay based on phase information of two pilot tones that are from the same transmitter and received by two different receivers, according to an embodiment. As previously described, at least some embodiments include dual pilot tones wherein the pilot tones are distributed on both sides of the signal spectrum. At least some embodiments include exploiting multiple narrowband tones to precisely determine the difference in time of flight from Tx antenna to the multiple Rx antennas. For example, assuming the distance form Tx to Rx1 is $L_1$, distance from Tx to Rx 2 is $L_2$, and that two tones having frequencies of $f_1$ and $f_2$ are from the same Tx, then the phase difference of the tone $f_1$ between two receivers can be given as $\Delta_1$, and the phase difference of the tone $f_1$ between two receivers can be given as $\Delta_2$. It can be determined that the distance difference $$|L_1 - L_2| = \frac{c|\Delta 1 - \Delta 2|}{2\pi|f1 - f2|},$$

or the time delay of the signal $$\Delta T = \left|\frac{|\Delta 1 - 2\Delta|}{2\pi|f1 - f2|}\right|,$$

in which c is the speed of light.

For embodiments that include one transmitter transmitting a pilot tone having a carrier frequency of $f_1$ and two receivers at a distance of $L_1$ and $L_2$ from the transmitter, the phases $\varphi_1$ and $\varphi_2$ of the signals at the receivers can be given as:

$$\varphi_1 = \varphi_T(t) + 2\pi f_1 t + k_{T1} L_1$$

$$\varphi_2 = \varphi_T(t) + 2\pi f_1 t + k_{T2} L_2$$

where $\varphi_T(t)$ is the phase of the transmitter, including phase noise of the transmitter, and $k_{T1} = 2\pi/\lambda_{T1} = 2\pi f_1/c$, wherein c is the speed of light.

The phase difference at the receivers is:

$$\Delta = \varphi_1 - \varphi_2 = k_{T1}(L_1 - L_2).$$

At least some embodiments include a phase modulus of $2\pi$. Therefore, the distance measurements are ambiguous up to the wavelength of the carrier frequency $\lambda_{T1}$. This can be solved by measuring at two carrier frequencies as follows:

$$\Delta_1 = \text{mod}[k_{T1}(L_1 - L_2), 2\pi] + 2\pi n_1$$

$$\Delta_2 = \text{mod}[k_{T2}(L_1 - L_2), 2\pi] + 2\pi n_2.$$

An improved measurement assumes $n_1 = n_2$, which is valid as long as:

$$k_{T1}(L_1 - L_2) - k_{T2}(L_1 - L_2) <_2 \pi,$$

which is equivalent to:

$$\left(\frac{2\pi(f1 - f2)}{c}\right) < \frac{2\pi}{L1 - L2}$$

$$L_1 - L_2 < \frac{c}{(f1 - f2)},$$

and the actual pathlength is given by:

$$|L_1 - L_2| = \frac{c|\Delta 1 - \Delta 2|}{2\pi|f1 - f2|}.$$

or the time delay is $$\Delta T = \left|\frac{|\Delta 1 - 2\Delta|}{2\pi|f1 - f2|}\right|.$$

FIG. 6 is a flow chart that includes steps of a method of analog spatial multiplexing, according to an embodiment. A first step 610 includes receiving, by a plurality of antennas, wireless signals, wherein the wireless signals originate from a multiple antenna transmitter, wherein a signal transmitted from each antenna of the multiple antenna transmitter includes one or more pilot tones configurations that are unique to the transmitted signal. A second step includes adjustably time delaying the received wireless signals, by a plurality of tunable time delays, wherein each tunable time delay receives a corresponding one of the plurality of wireless signals after the wireless signals have been frequency down-converted. A third step 630 includes adjusting a frequency response, by a plurality of frequency response equalizers, wherein each frequency response equalizer receives a corresponding tunable delay output and adjusts the frequency response, wherein a time delay of each of the tunable time delays is adjusted based on a feedback of measurements of the one or more pilot tones of more than one output of the plurality of frequency response equalizers. A fourth step 640 includes generating a plurality of frequency up-converted signals, by a plurality of frequency up-converters, wherein each frequency up-converter frequency up-converts a corresponding one of output signals of the plurality of frequency response equalizers. A fifth step 650 includes a MIMO (multiple-input, multiple-output) processor receiving the plurality of frequency up-converted signals, wherein the MIMO processor adjusts a gain and phase of the of the frequency up-converted signals based on the measurements of the one or more pilot tones. A sixth step 660 includes receiving and frequency down-converting output signals from the MIMO processor, by a plurality of frequency down-converters, wherein each of a plurality of frequency down-converted signal are received by a SISO (single input, single output) modem.

As previously described, for an embodiment, adjustably time delaying the received wireless signals by the plurality of tunable time delays includes delaying the received wireless signals with a continuously wavelength tunable optical source and dispersion in an optical fiber.

As previously described, for an embodiment, the tunable time delays are adjusted to compensate for time delay differences between a commonly transmitted signal received at more than one of the plurality of antennas, wherein the commonly transmitted signal is transmitted from an antenna of the multiple antenna transmitter.

As previously described, for an embodiment, each frequency response equalizer receiving the corresponding tunable delay output and adjusting the frequency response includes adjusting the frequency response of the corresponding tunable delay output, resulting in the adjusted frequency response of the corresponding tunable delay output to be more similar than a frequency response of another tunable delay output.

As previously described, for an embodiment, measurements of the one or more pilot tones includes measurements of a phase or time difference between more one or more pilot tones of a commonly transmitted signal received by more than one of the plurality of antennas.

As previously described, for an embodiment, the corresponding one of output signals of the plurality of frequency response equalizers are frequency up-converted enough to allow for frequency response suppression of greater than a threshold within certain bandwidth.

As previously described, for an embodiment, the measurements of the one or more pilot tones provide feedforward control of the MIMO processor that receives the plurality of frequency up-converted signals. For an embodiment, the feedforward control of the MIMO processor is based on measurements of multiple tones of each transmitted signal. For an embodiment, the feedforward control adjusts an amplitude and phase of each of the frequency up-converted signals based on the measurements of the one or more pilot tones.

Figure 7:
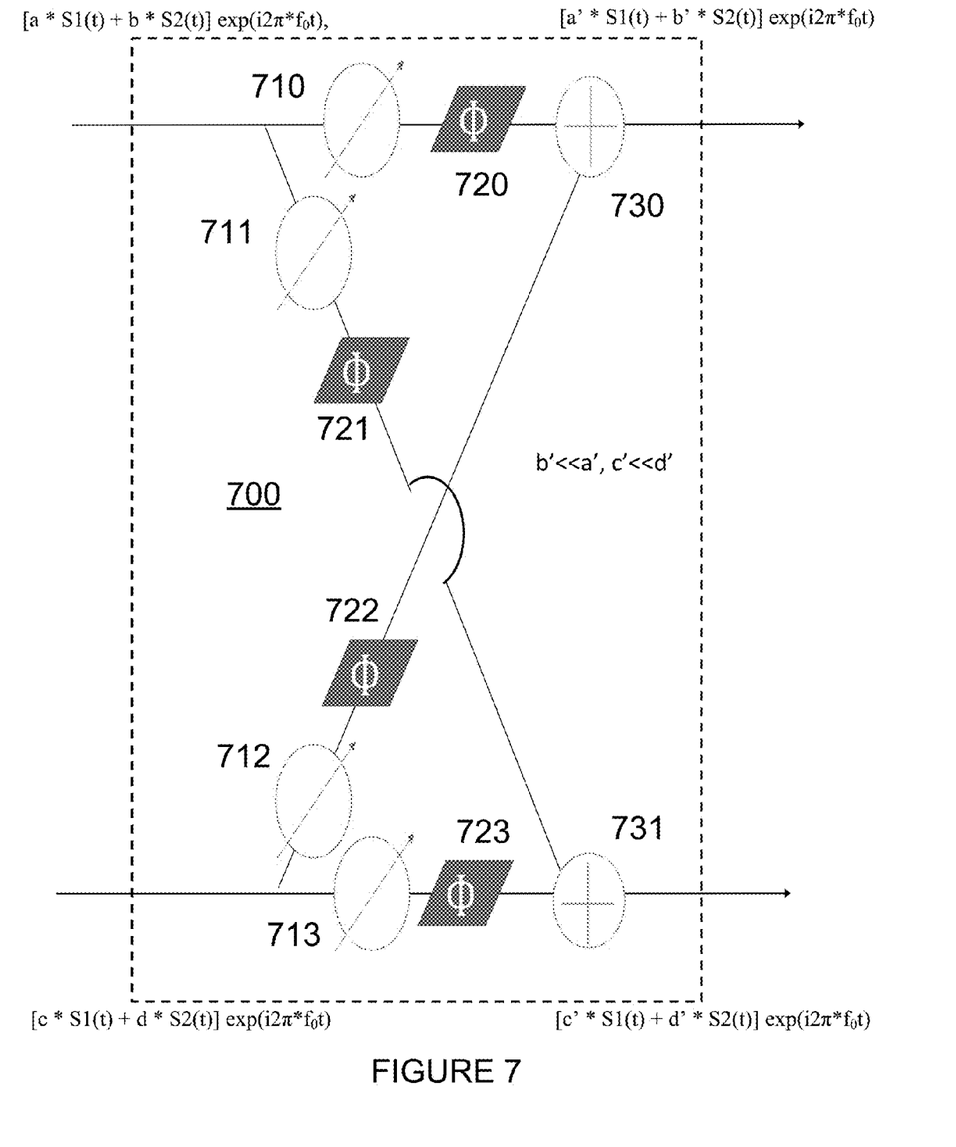
FIG. 7 shows a block diagram of MIMO processing, according to an embodiment.

FIG. 7 shows a block diagram of MIMO processing 700, according to an embodiment. As shown, the MIMO processing 700 includes automatic attenuation or gain control 711, automatic phase or delay control 722, and combiners 731. As previously described, for an embodiment the automatic attenuation or gain control 711 and automatic phase or delay control 722, are controlled based on training of the transmission channel between the multiple antenna transmitter and the multiple antenna receiver. As previously described, the training of the channel is performed using the pilot tones. The automatic attenuation or gain control 711 and automatic phase or delay control 722 are controlled to spatially separate signals received from different transmit antennas of the multiple antenna transmitter.

Assuming a received signal S1(*t*) from the first transmitter and a received signal S2(*t*) from the second transmitter, a first input to the MIMO processing 700 can be represented as:

[a*S1(*t*)+b*S2(*t*)]exp(*i*2π*f*₀*t*), wherein it can be assumed the a is approximately equal to b;

and a first output of the MIMO processing can be represented as:

[a'*S1(*t*)+b'*S2(*t*)]exp(*i*2π*f*₀*t*), wherein a'>>b';

Further, the second input to the MIMO processing can be represented as:

[c*S1(*t*)+d*S2(*t*)]exp(*i*2π*f*₀*t*), wherein it can be assumed the a is approximately equal to b; and a second output of the MIMO processing can be represented as:

[c'*S1(*t*)+d'*S2(*t*)]exp(*i*2π*f*₀*t*), wherein c'>>d'.

The coefficients a, b, c, d are complex coefficients of the received signals before the MIMO processing, and the coefficients a', b', c', d' are complex coefficients of the received signals after the MIMO processing. The amplitudes of these coefficients represent the amplitudes of the received signals and the phase of these coefficients represents the phases of the received signals.

Ideally, the MIMO processing includes amplitude and phase control which set the MIMO processing such that a complex coefficient matrix $H_{ij}$ of the MIMO processing is represented by:

$$\begin{bmatrix} H_{11} & H_{12} \\ H_{21} & H_{22} \end{bmatrix} \begin{bmatrix} a & b \\ c & d \end{bmatrix} = \begin{bmatrix} a' & 0 \\ 0 & d' \end{bmatrix}.$$

For an exemplary 2×2 MIMO system, the channel interference cancellation is based on principles of delay-line interferometer (DLIs). For an embodiment, a delay line interferometer is a device that splits an incoming RF/optical signal into two equal-intensity signals in two arms, in which one signal is delayed by a path difference. After recombination, the two signals interfere with each other constructively or destructively.

For an embodiment, each receive signal is split into two similar copies, wherein each copy is received by one of the two receivers. One of the copies has a path delay of (N+½)λ, introduced. The two copies are then combined, and the resulting output signal power has a minimum at $f_0=c/\lambda$.

A feature of a DLI is that the DLI is frequency independent. According to the physics of the DLI, the higher the frequency and the smaller |N| the larger the power suppression bandwidth of the destruction interference. Therefore, an embodiment includes MIMO processing at a relatively high carrier bandwidth ($f_0$>>signal bandwidth) to achieve interference cancellation over a broad bandwidth, resulting in better MIMO performance. Generally, the higher the carrier frequency $f_0$, the greater the suppression over a bandwidth.

Figure 8:
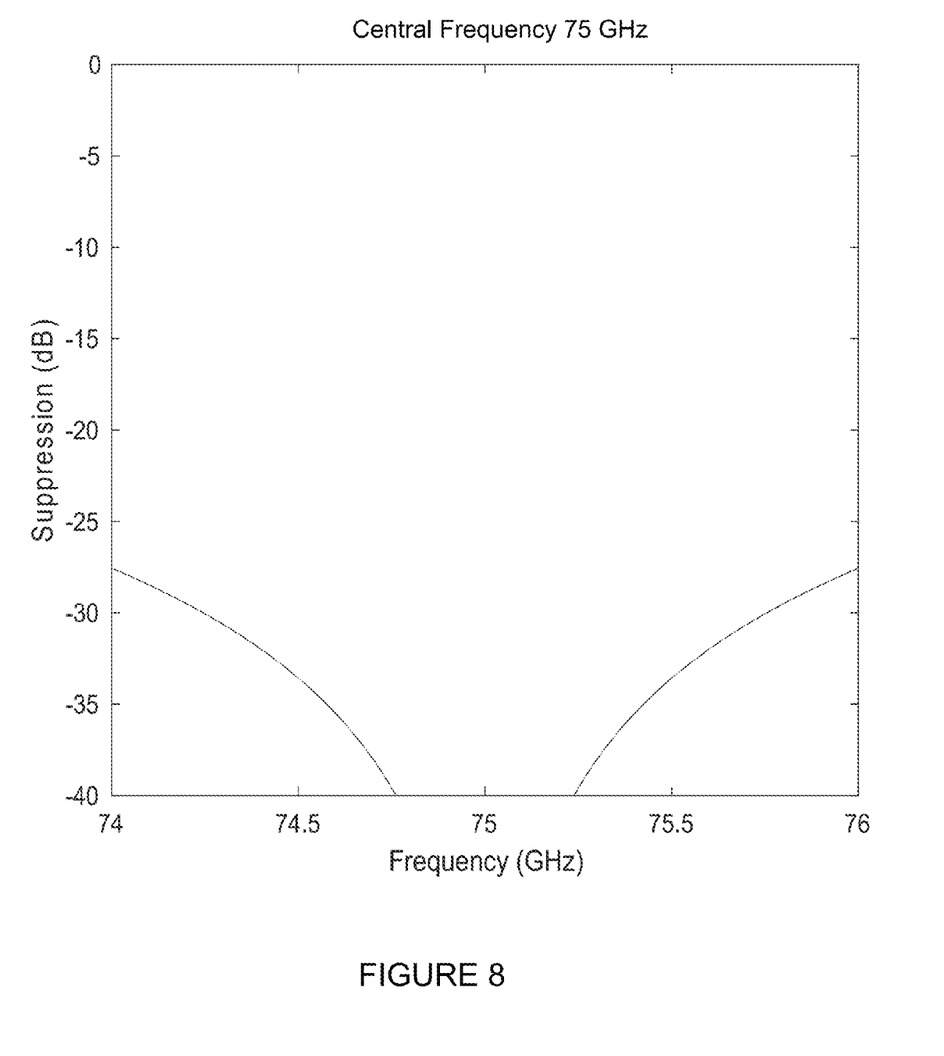
FIG. 8 shows a plot that depicts signal suppression for MIMO processing with a center frequency of 75 GHz, according to an embodiment.

FIG. 8 shows a plot that depicts signal suppression for MIMO processing with a center frequency of 75 GHz, according to an embodiment.

Figure 9:
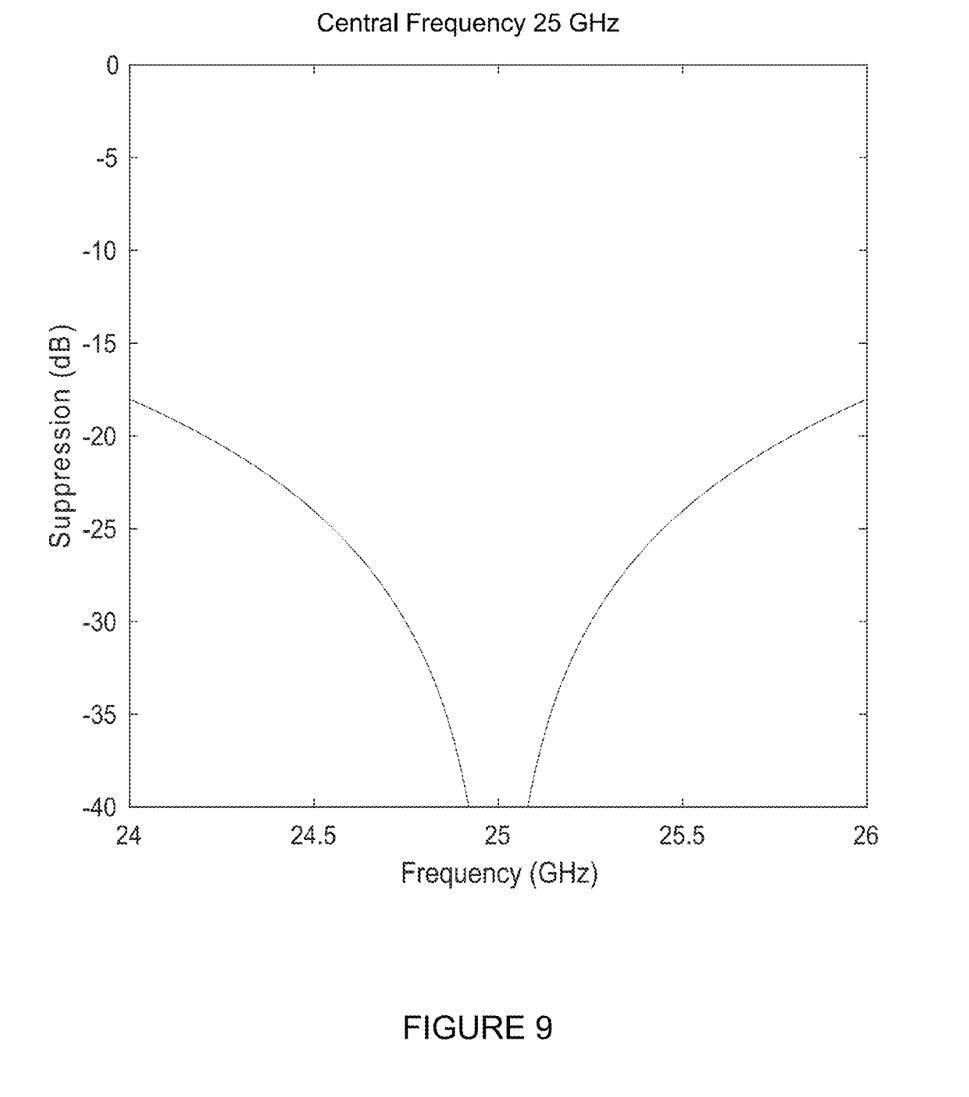
FIG. 9 shows a plot that depicts signal suppression for MIMO processing with a center frequency of 25 GHz, according to an embodiment.

FIG. 9 shows a plot that depicts signal suppression for MIMO processing with a center frequency of 25 GHz, according to an embodiment.

Figure 10:
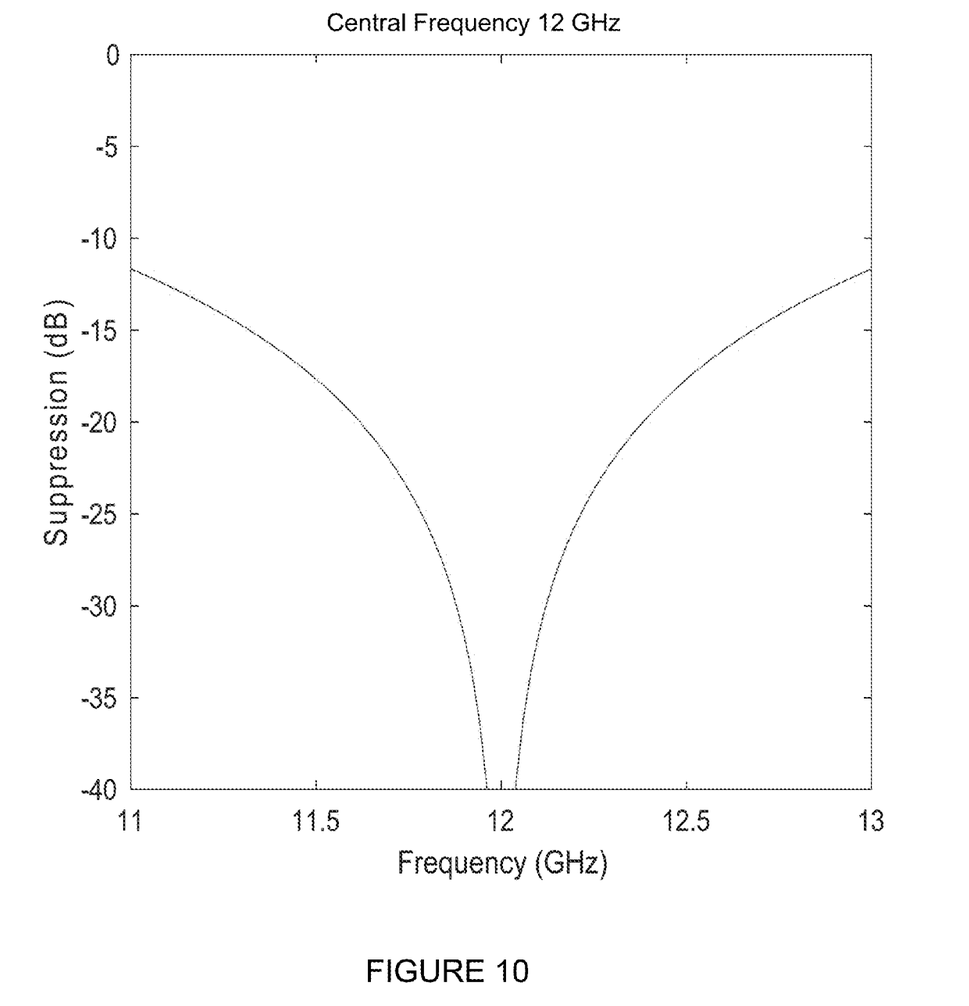
FIG. 10 shows a plot that depicts signal suppression for MIMO processing with a center frequency of 12 GHz, according to an embodiment.

FIG. 10 shows a plot that depicts signal suppression for MIMO processing with a center frequency of 12 GHz, according to an embodiment.

As can be observed from the plots of FIGS. 8, 9, 10, the greater the center frequency, the greater the suppression. That is, the greater the frequency up-conversion before the spatial processing, the greater the realizable suppression. For an embodiment, the center of the signals input to the MIMO processing is frequency up-converted by an amount to enable suppression of greater than a threshold.

Although specific embodiments have been described and illustrated, the embodiments are not to be limited to the specific forms or arrangements of parts so described and illustrated. The described embodiments are to only be limited by the claims.

What is claimed:
1. A receiver, comprising:
 a plurality of antennas operative to receive a plurality of wireless signals, wherein the wireless signals originate from a multiple antenna transmitter, wherein a signal transmitted from each antenna of the multiple antenna transmitter includes one or more pilot tones configurations that are unique to the transmitted signal;

a plurality of tunable time delays, wherein each tunable time delay receives a corresponding one of the plurality of wireless signals after the wireless signals have been frequency down-converted;

a plurality of frequency response equalizers, each frequency response equalizer receiving a corresponding tunable delay output and adjusting a frequency response;

wherein a time delay of each of the tunable time delays is adjusted based on a feedback of measurements of the one or more pilot tones of more than one output of the plurality of frequency response equalizers;

a plurality of frequency up-converters generating a plurality of frequency up-converted signals, wherein each frequency up-converter frequency up-converts a corresponding one of output signals of the plurality of frequency response equalizers;

a MIMO (multiple-input, multiple-output) processor receiving the plurality of frequency up-converted signals, wherein the MIMO processor adjusts a gain and phase of the of the frequency up-converted signals based on the measurements of the one or more pilot tones; and a plurality of frequency down-converters receiving and frequency down-converting output signals from the MIMO processor, wherein each of a plurality of frequency down-converted signal are received by a SISO (single input, single output) modem.

2. The receiver of claim 1, wherein at least one of the tunable time delays comprises optical circuitry, comprising a continuously wavelength tunable optical source and dispersion in an optical fiber.

3. The receiver of claim 1, wherein the tunable time delays are adjusted to compensate for time delay differences between a commonly transmitted signal received at more than one of the plurality of antennas, wherein the commonly transmitted signal is transmitted from an antenna of the multiple antenna transmitter.

4. The receiver of claim 1, wherein each frequency response equalizer receiving the corresponding tunable delay output and adjusting the frequency response comprises adjusting the frequency response of the corresponding tunable delay output, resulting in the adjusted frequency response of the corresponding tunable delay output to be more similar than a frequency response of another tunable delay output.

5. The receiver of claim 1, wherein measurements of the one or more pilot tones comprises measuring a phase or time difference between more one or more pilot tones of a commonly transmitted signal received by more than one of the plurality of antennas.

6. The receiver of claim 1, wherein the corresponding one of output signals of the plurality of frequency response equalizers are frequency up-converted enough to allow for frequency response suppression of greater than a threshold within certain bandwidth.

7. The receiver of claim 1, wherein the measurements of the one or more pilot tones provides feedforward control of the MIMO processor that receives the plurality of frequency up-converted signals.

8. The receiver of claim 7, wherein the feedforward control of the MIMO processor is based on measurements of multiple pilot tones of each transmitted signal.

9. The receiver of claim 7, wherein the feedforward control of the MIMO processor is based on measurements of multiple tones of each transmitted signal.

10. The receiver of claim 8, wherein the feedforward control adjusts an amplitude and phase of each of the frequency up-converted signals based on the measurements of the one or more pilot tones.

11. A method, comprising:
receiving, by a plurality of antennas, wireless signals, wherein the wireless signals originate from a multiple antenna transmitter, wherein a signal transmitted from each antenna of the multiple antenna transmitter includes one or more pilot tones configurations that are unique to the transmitted signal;

adjustably time delaying the received wireless signals, by a plurality of tunable time delays, wherein each tunable time delay receives a corresponding one of the plurality of wireless signals after the wireless signals have been frequency down-converted;

adjusting a frequency response, by a plurality of frequency response equalizers, wherein each frequency response equalizer receives a corresponding tunable delay output and adjusts the frequency response;

wherein a time delay of each of the tunable time delays is adjusted based on a feedback of measurements of the one or more pilot tones of more than one output of the plurality of frequency response equalizers;

generating a plurality of frequency up-converted signals, by a plurality of frequency up-converters, wherein each frequency up-converter frequency up-converts a corresponding one of output signals of the plurality of frequency response equalizers;

a MIMO (multiple-input, multiple-output) processor receiving the plurality of frequency up-converted signals, wherein the MIMO processor adjusts a gain and phase of the of the frequency up-converted signals based on the measurements of the one or more pilot tones; and receiving and frequency down-converting output signals from the MIMO processor, by a plurality of frequency down-converters, wherein each of a plurality of frequency down-converted signal are received by a SISO (single input, single output) modem.

12. The method of claim 11, wherein adjustably time delaying the received wireless signals, by the plurality of tunable time delays, comprises delaying the received wireless signals with a continuously wavelength tunable optical source and dispersion in an optical fiber.

13. The method of claim 11, wherein the tunable time delays are adjusted to compensate for time delay differences between a commonly transmitted signal received at more than one of the plurality of antennas, wherein the commonly transmitted signal is transmitted from an antenna of the multiple antenna transmitter.

14. The method of claim 11, wherein each frequency response equalizer receiving the corresponding tunable delay output and adjusting the frequency response comprises adjusting the frequency response of the corresponding tunable delay output, resulting in the adjusted frequency response of the corresponding tunable delay output to be more similar than a frequency response of another tunable delay output.

15. The method of claim 11, wherein measurements of the one or more pilot tones comprises measuring a phase or time difference between more one or more pilot tones of a commonly transmitted signal received by more than one of the plurality of antennas.

16. The method of claim 11, wherein the corresponding one of output signals of the plurality of frequency response equalizers are frequency up-converted enough to allow for frequency response suppression of greater than a threshold within certain bandwidth.

17. The method of claim 11, wherein the measurements of the one or more pilot tones provides feedforward control of the MIMO processor that receives the plurality of frequency up-converted signals.

18. The method of claim 17, wherein the feedforward control of the MIMO processor is based on measurements of multiple pilot tones of each transmitted signal.

19. The method of claim 17, wherein the feedforward control of the MIMO processor is based on measurements of multiple tones of each transmitted signal.

20. The method of claim 18, wherein the feedforward control adjusts an amplitude and phase of each of the frequency up-converted signals based on the measurements of the one or more pilot tones.

* * * * *